US009228619B2

(12) United States Patent
Geiger (10) Patent No.: US 9,228,619 B2
(45) Date of Patent: Jan. 5, 2016

(54) FRICTION CLUTCH

(71) Applicant: LICOS TRUCKTEC GMBH, Markdorf (DE)

(72) Inventor: Sigmund Geiger, Markdorf (DE)

(73) Assignee: Licos Trucktec GmbH, Markdorf (DE)

( * ) Notice: Subject to any disclaimer, the term of this patent is extended or adjusted under 35 U.S.C. 154(b) by 0 days.

(21) Appl. No.: 14/159,788

(22) Filed: Jan. 21, 2014

(65) Prior Publication Data

US 2014/0202822 A1 Jul. 24, 2014

(30) Foreign Application Priority Data

Jan. 22, 2013 (DE) .......................... 10 2013 000 975

(51) Int. Cl.
| | |
|---|---|
| *F16D 13/22* | (2006.01) |
| *F16D 13/56* | (2006.01) |
| *F16D 13/52* | (2006.01) |
| *F16D 25/063* | (2006.01) |

(52) U.S. Cl.
CPC ................ *F16D 13/52* (2013.01); *F16D 13/22* (2013.01); *F16D 25/063* (2013.01); *F16D 2250/0084* (2013.01)

(58) Field of Classification Search
CPC .......................... B25B 27/0064; F16D 25/0632
USPC ........................................................ 192/66.22
See application file for complete search history.

(56) References Cited

U.S. PATENT DOCUMENTS

| 191,314 A * | 5/1877 | Clark .......................... 192/70.15 |
| 430,907 A * | 6/1890 | Wiegand ................. F16D 13/28 |
| | | 192/70.15 |
| 502,570 A * | 8/1893 | Masterman ...................... 192/35 |
| 2,339,643 A * | 1/1944 | Le Tourneau .............. 192/70.15 |
| 5,918,718 A * | 7/1999 | Jahn et al. ................. 192/107 R |
| 8,925,703 B2 * | 1/2015 | Wolf et al. ................. 192/66.22 |
| 2010/0029396 A1 * | 2/2010 | Fujio et al. ..................... 464/160 |

* cited by examiner

*Primary Examiner* — Ramya Burgess
*Assistant Examiner* — Mark Manley
(74) *Attorney, Agent, or Firm* — Burr & Brown, PLLC (57) ABSTRACT

A friction clutch having a clutch ring and having two clutch disks, which are mounted so as to be rotatable about a clutch axis of rotation and on which friction surfaces are formed, is presented. In this case, the clutch ring and the clutch disks can be moved parallel to the clutch axis of rotation and relative to one another in such a way that, for torque transmission, first friction surfaces on each of the clutch disks can be moved into frictional surface contact with a respective second friction surface on the clutch ring. A first and a second friction surface in each case are matched to one another as a friction surface pair, having in each case a friction surface curved convexly in the direction of the clutch axis of rotation and a friction surface curved concavely in the direction of the clutch axis of rotation.

10 Claims, 7 Drawing Sheets

FRICTION CLUTCH

CROSS REFERENCE TO RELATED APPLICATION

This application claims the benefit under 35 USC §119(a)-(d) of German Application No. 10 2013 000 975.8 filed Jan. 22, 2013.

FIELD OF THE INVENTION

The invention relates to a friction clutch.

BACKGROUND OF THE INVENTION

Friction clutches are known in a very wide variety of embodiments, especially in the area of vehicle construction. Here, a construction which is as compact and space-saving as possible is the aim, especially for the transmission of rotary motion to an auxiliary unit.

For example, friction clutches are known in which two clutch disks and a clutch ring are mounted so as to be rotatable about a common clutch axis of rotation, wherein the two clutch disks are mounted so as to be movable axially along the clutch axis of rotation relative to one another and with respect to a clutch ring. The clutch disks can each be mounted for conjoint rotation and axial movement on a common rotary shaft, allowing them to be brought into frictional contact with the clutch ring, which is mounted so as to be rotatable separately from the clutch disks, by moving them together or moving them apart, for example. Moreover, the two clutch disks can also be mounted separately from one another and, for example, coaxially in order, for example, to transmit a rotary motion from a first one of the clutch disks to a second one of the clutch disks via the clutch ring.

In such clutches, the friction surfaces are often formed on conical surface regions of the clutch disks and the clutch ring. In this case, the clutch disks can be pushed like wedges into the clutch ring, for example, thereby making it possible to achieve a wedging effect, by means of which a transmissible torque can advantageously be increased. However, large amounts of heat can arise during the closing or release of such clutches, and these can not only subject the interacting friction surfaces to relatively high stress but can also make it more difficult to separate the friction surfaces for decoupling if the actuating forces are too high.

SUMMARY OF THE INVENTION

It is the object of the present invention to provide an improved friction clutch which has increased stability and reliability for the same overall size.

The invention starts from a friction clutch having a clutch ring and having two clutch disks, wherein the clutch ring and the clutch disks are mounted so as to be rotatable about a clutch axis of rotation, in particular a common clutch axis of rotation. Friction surfaces are formed on the clutch ring and on the clutch disks. The clutch ring and the clutch disks can be moved parallel to the clutch axis of rotation and relative to one another in such a way that, for torque transmission, first friction surfaces on each of the clutch disks can be moved into frictional surface contact with a respective second friction surface on the clutch ring.

The heart of the invention is that a first and a second friction surface in each case are matched to one another as a friction surface pair, having in each case a friction surface curved convexly in the direction of the clutch axis of rotation and a friction surface curved concavely in the direction of the clutch axis of rotation.

The friction surfaces are therefore not arranged exclusively perpendicular to the clutch axis of rotation but have surface regions with a tangential surface, the normal vector of which has a component oriented radially outward. In this context, a friction surface curvature which is concave or convex in the direction of the clutch axis of rotation means that, in addition to the curvature defined by the clutch axis of rotation, each individual friction surface of a friction surface pair also has at least one center of curvature which has at least one radius of curvature perpendicular to the clutch axis of rotation. The radii of curvature can be different. Conceptually, the additional curvature can be represented with the aid of a plane which is parallel to the clutch axis of rotation, passes through the clutch axis of rotation and intersects one of the friction surfaces, wherein a convexly or concavely curved friction surface is formed on this plane as an arcuately curved line segment which has a finite, constant or variable radius of curvature.

A first and a second friction surface of a friction surface pair are preferably matched to one another in such a way that, when in frictional contact, the centers of curvature, for example, and the radii of curvature, for example, of mutually contacting friction surface regions curved along the clutch axis of rotation coincide, in particular in all the touching friction surface regions. As a result, the friction surfaces are advantageously fully in contact in the coupled state and contribute as a whole to torque transmission.

Since, apart from a curvature about the axis of rotation of the clutch, the friction surfaces additionally have another curvature in a direction parallel to the clutch axis of rotation, the clutch according to the invention can provide a larger friction surface over a given length along the clutch axis of rotation than, for example, a clutch with conical friction surfaces. Moreover, the curved friction surfaces advantageously counteract self-locking of the clutch disks on the clutch ring. This is due to the fact that, when the friction surfaces are pressed together, the additional curvature of the friction surfaces along the clutch axis of rotation means that the forces on a radially outer friction surface over a corresponding segment of the clutch axis of rotation are not inclined at a uniform angle with respect to a plane perpendicularly intersecting the clutch axis of rotation but that this inclination of the direction of force varies along the clutch axis of rotation. As a result, a friction surface pair can have both surface segments with a relatively powerful wedging effect and also surface regions which counteract sticking in the coupled state.

In this case, the concavely and the convexly curved friction surfaces can have at least approximately a spherical profile. This offers the advantage that, for example, a convex friction surface has a convex shape not only around the clutch axis but also in the direction along the clutch axis. In this case, the centers of curvature of curves which extend in mutually independent directions of one of the friction surfaces advantageously lie on a common side with respect to the friction surface under consideration. Because the production of spherical surface shapes can be controlled more effectively, it is preferred, in particular, if the friction surfaces have a spherical profile in accordance with a surface segment of a sphere or of a spherical cavity.

In principle, it is also possible to conceive of embodiments of the friction clutch according to the invention in which the friction surfaces are convexly and concavely curved, thereby making it possible for them to resemble the surface segments of a torus, for example.

The friction surfaces of a friction surface pair are preferably shaped in the manner of a segment of a boundary surface, in particular having surface segments a spherical surface. In particular, the friction surfaces have the form of a surface of a spherical segment. In the present invention, the term spherical segment is understood in accordance with the mathematical definition to be a segment of a sphere with plane-parallel side faces. In the text which follows, this kind of surface shape is referred to as a spherical surface strip. In the case of a concave friction surface, the surface segment preferably corresponds to a spherical surface strip of the inner surface of a hollow sphere, at least in part. Such an embodiment offers the advantage that the friction surfaces of a friction surface pair and surface segment of a sphere or of a hollow sphere always remain in frictional surface contact, even in the case of different axial forces parallel to the clutch axis of rotation.

The second friction surfaces on the clutch ring can be convexly curved. For a preferred embodiment of the invention, provision is made for the second friction surfaces on the clutch ring to be concavely curved. In this case, the first friction surfaces of the clutch disk can fit into the concave friction surfaces of the clutch ring, in the case of an axial movement until abutment against the clutch ring, for example, and thereby advantageously achieve a relatively high wedging effect.

In particular, if the second friction surfaces on the clutch ring are not only concavely curved but also slope toward one another, this offers the advantage that the friction clutch can be designed in such a way that the clutch disks, lying within the clutch ring, come into frictional contact with the second friction surfaces when moved apart and, in frictional engagement, form a substantially closed system, into which penetration of contaminants is entirely or virtually impossible.

For a preferred embodiment of the invention, the clutch ring is designed as a component produced in one continuous piece and preferably from a single material. As a result, the clutch ring advantageously has a high stability. If the clutch ring is produced in one continuous piece from a single material, the homogeneous material composition which can thereby be achieved offers better thermal conductivity for the dissipation of frictional heat, for example.

The diameters of the clutch disks can be reduced in such a way over an angle segment around a predetermined axis of rotation that the clutch disks can be introduced jointly into the clutch ring. This makes it possible to assemble a clutch according to the invention even with an integrally formed clutch ring.

In order to avoid an unbalance during rotary motion of the clutch disks, the diameters of the two clutch disks are each reduced symmetrically with respect to a predetermined axis of rotation over an angle segment.

Moreover, assembly of the clutch can also be made easier if at least one recess, with the aid of which the clutch disks can be introduced into the clutch ring, is formed on the clutch ring.

One or more springs, which push the clutch disks away from one another, can be arranged between the clutch disks. It is furthermore possible for one or more spring elements that can move the clutch disks away from one another out of a decoupled position, for example, to act on the clutch disks.

In order to ensure release of both clutch disks from the clutch ring when the friction clutch according to the invention is actuated for decoupling, a stop element, e.g. an annular stop element, is preferably formed in the clutch ring between two concave friction surfaces of the clutch ring, for example. By way of example, the clutch ring can have one or more openings, in particular one or more openings between interior friction surfaces, at which a stop element, e.g. a stop ring, can be introduced into the clutch ring and preferably between the clutch disks. It is thereby advantageously possible to mount a stop element in the clutch ring after installation of the clutch disks. In order to avoid openings in the clutch ring, fixing means can be provided, by means of which a stop element can be mounted temporarily on at least one of the clutch disks for joint assembly with the clutch disks. It is thereby possible to achieve a relatively higher strength for the clutch ring.

BRIEF DESCRIPTION OF THE DRAWINGS

In the text which follows, the invention is explained in greater detail using a number of illustrative embodiments with the aid of drawings, and further advantages are presented.

DETAILED DESCRIPTION OF THE INVENTION

Figure 1:
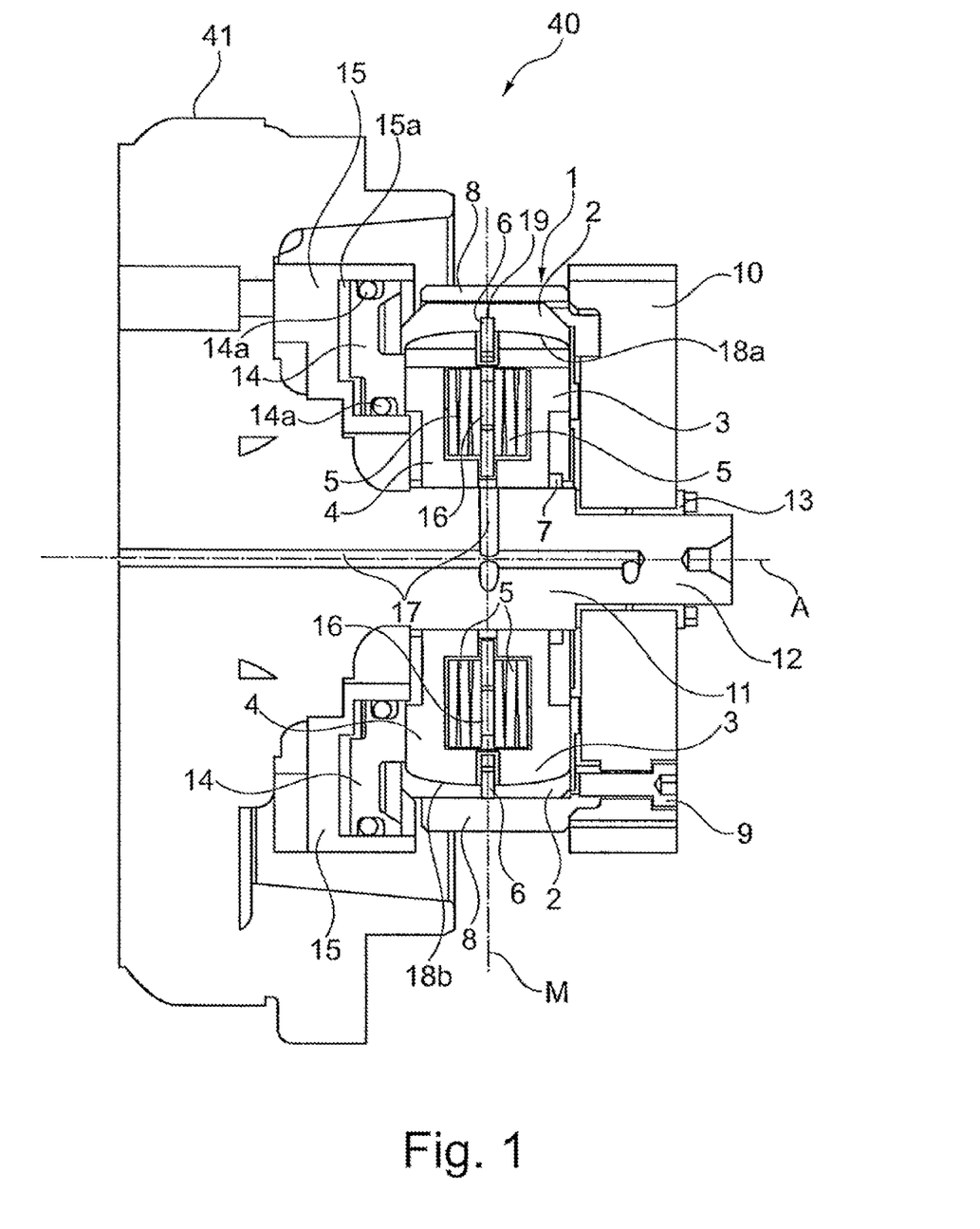
FIG. 1 shows a schematic side view of a section of a compressor having a clutch according to the invention in a section parallel to the clutch axis of rotation.

FIG. 1 shows a section of a compressor 40 having a friction clutch 1 according to the invention. The friction clutch 1 is provided for the purpose of transmitting a rotary motion from a driving wheel to a rotary shaft 11, 12 or of decoupling the two parts, as the case may be.

In FIG. 1, the friction clutch 1 is shown in the coupled state. A clutch ring 2 provides an input side of the clutch and is connected by driver element 8 to the driving wheel 10. The driver element 8 can be of single- or multi-part design and is secured on the driving wheel 10 by means of a screw 9, for example.

The driving wheel 10 is mounted coaxially with a front shaft section and coaxially with the driven shaft by means of a rotary bearing. The clutch 1, the driving wheel 10 and the rotary shaft 11, 12 rotate about a common axis A, which simultaneously defines a clutch axis of rotation.

Two clutch disks 3 and 4 are arranged between the clutch ring 2 and the shaft section 11 and are mounted so as to be axially movable parallel to the clutch axis of rotation A. One or more spring elements 5 are arranged between the clutch disks 3 and 4 and can consist of two stacks of diaphragm springs, for example. The springs 5 hold the clutch disks 3 and 4 in a disengaged position, with a first friction surface pair 18*a* being in frictional contact between clutch disk 3 and the clutch ring 2, and a second friction surface pair 18*b* being in frictional contact between clutch disk 4 and the clutch ring 2. By means of a spherical convex curvature of the friction surface pairs 18*a* and 18*b* on the part of the clutch ring 2, the extent to which the clutch disks 3 and 4 can move apart in the axial direction A is limited.

In the region of a central plane perpendicular to the axis of rotation A, the clutch ring 2 has a groove-shaped recess 19, into which a stop ring 6 projects, thereby fixing the position of the stop ring 6.

A retaining ring 7, which limits axial movements parallel to the axis of rotation in the direction of the driving wheel 10, is mounted on the shaft section 11. An annular piston 14 is provided for actuation of the clutch 1. The annular piston 14 is mounted so as to be movable in a cylinder 15 and is sealed off with respect to the cylinder 15 by sealing rings 14*a* in such a way that pressures by means of which the piston 14 can move clutch disk 4 toward clutch disk 3, counter to the force of the spring 5, can be set in a pressure space 15*a* of the cylinder 15. By means of the stop ring 6, it is possible to ensure that the clutch ring 2 is released from both clutch disks 3 and 4 when the clutch disks 3 and 4 move together and hence that the driving wheel 10 is decoupled from the shaft 11, 12.

Figure 2:
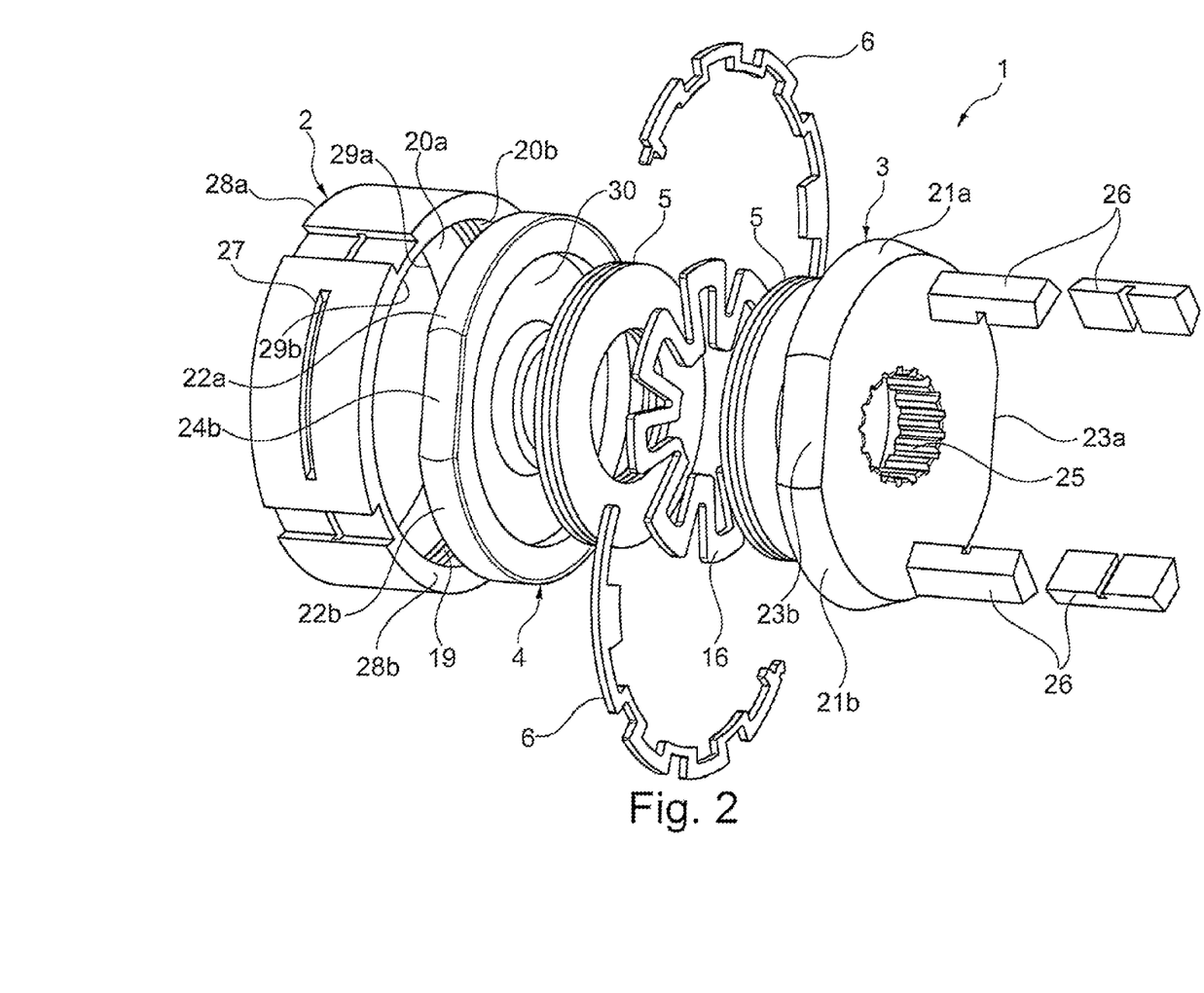
FIG. 2 shows an exploded schematic perspective view of a clutch according to the invention.

Another illustrative embodiment of a friction clutch 1 according to the invention is shown in FIG. 2. The friction clutch 1 has a clutch ring 2, which is preferably of integral design. Two friction surfaces 20*a* and 20*b*, each fully encompassing the axis of rotation of symmetry of the clutch ring 2, are formed on the inside of the clutch ring 2. In this case, the friction surfaces 20*a* and 20*b* have a spherical curvature, i.e. they not only have a curvature around the principal axis of the clutch ring but additionally have a nonlinear curved profile along the principal axis. By virtue of the curvature, the two friction surfaces 20*a* and 20*b* have the largest inside diameter in the center. At the same time, the two friction surfaces 20*a* and 20*b* slope concavely toward one another in such a way that each of the two friction surfaces 20*a* and 20*b* reaches the smallest inside diameter at the respective end face 28*a* and 28*b*. At these end faces 28*a* and 28*b*, the friction surfaces 20*a* and 20*b* are each bounded by an outer edge 29*a* and 29*b*.

The friction surfaces 20*a* and 20*b* are separated from one another by a groove 19 extending between them on the inside of the clutch ring 2. The clutch ring 2 can have slots 27, at which the clutch ring 2 is penetrated as far as the groove 19 and through which segments of a stop ring 6, for example, can be introduced into the region within the clutch ring 2.

The friction clutch 1 comprises two clutch disks 3 and 4, which are of annular design. On their central inner opening, the clutch disks 3 and 4 can have a spline system 25, by means of which the clutch disks can be mounted for conjoint rotation and axial movement on a splined shaft (not shown).

Friction surfaces 21*a* and 21*b* are formed on a radially outward-facing edge surface of the clutch disks 3. Clutch disk 4 likewise has frictional surfaces 22*a* and 22*b* on an outer edge surface. The friction surfaces 21*a*, 21*b*, 22*a* and 22*b* of the clutch disks 3 and 4 are matched to the respective friction surfaces 20*a* and 20*b* of the clutch ring 20. In particular, they can be of convex design with the same sphere radius of a spherical surface as the concave frictional surfaces 20*a* and 20*b* on the inside of the clutch ring 2.

The central point of the friction surfaces formed as spherical surface segments is at the center of the clutch ring 2, toward which the clutch disks 3 and 4 can be moved in order to release the friction surfaces 21*a*, 21*b* and 22*a*, 22*b* from the respective friction surface 20*a* and 20*b* on the clutch ring.

Another illustrative embodiment of a friction clutch 1 according to the invention, with the aid of which a procedure for assembling the friction clutch 1 will be explained below, is shown in FIGS. 3, 4, 5, 6, 7*a* and 7*b*.

Figure 3:
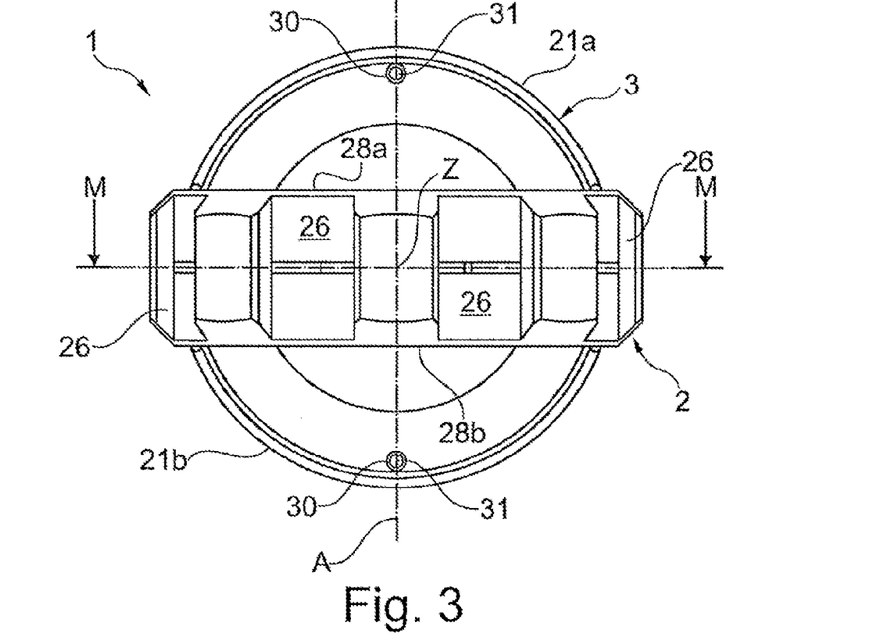
FIG. 3 shows a plan view of a clutch according to the invention in the assembly position.
Figure 4:
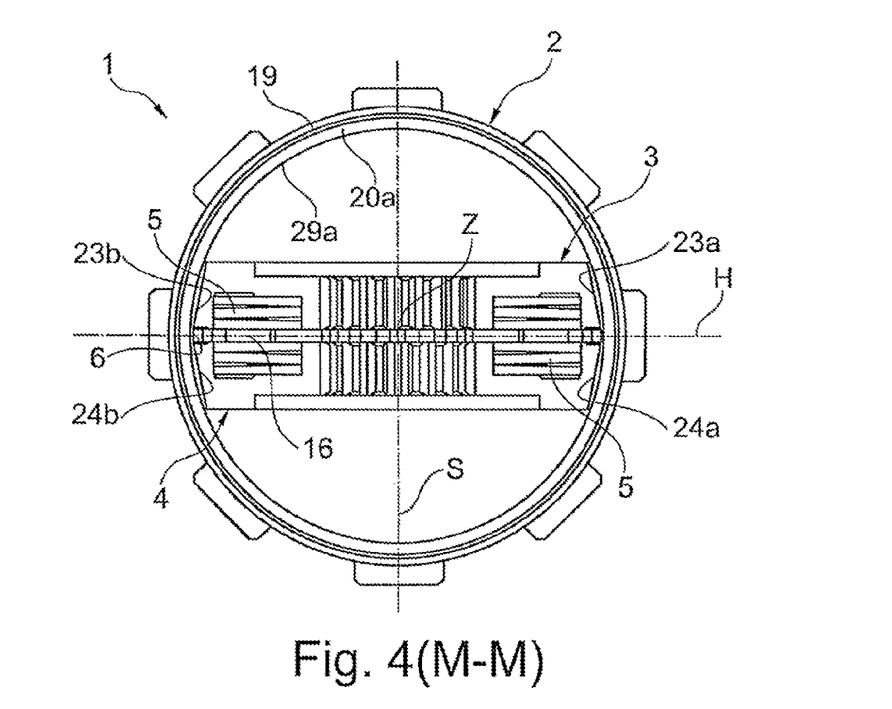
FIG. 4 shows a schematic side view of a clutch according to the invention in section in a section plane perpendicular to the plane of symmetry of the clutch axis of rotation.

In FIGS. 3 and 4, the friction clutch is shown in a first assembly position. Two friction clutches 3 and 4 are pressed together counter to a force of spring elements 5, wherein a passage disk 16 and a stop spring 6 are arranged between the clutch disks 3 and 4. The clutch disks 3 and 4 are arranged symmetrically above and below an intermediate plane, horizontal plane H (FIG. 4), in which the clutch axis A is embedded and which intersects a central plane M of the clutch ring 2 at right angles.

On the inside, the clutch ring 2 has two concave spherical friction surfaces 20*a* and 20*b*, which are separated from one another by a groove 19. Here, the two friction surfaces 20*a* and 20*b* correspond to spherical segment boundary surfaces on an inside of a common spherical shell. Accordingly, the friction surfaces 20*a* and 20*b* are curved with an identical constant radius of curvature around a common center of curvature.

At an outer edge 29*a*, a concave spherical friction surface 20*a* and an end face 28*a* meet. In the same way, a friction surface 20*b* and an end face 28*b* of the clutch ring 2 meet at an outer edge 29*b*. The outer edges 29*a* and 29*b* preferably have an identical inside diameter or inner radius.

A central plane M of the clutch ring 2, the plane being shown in FIG. 3, is perpendicular to the clutch axis of rotation and forms a section plane for a view along the clutch axis of rotation A, the view being shown in FIG. 4. The horizontal plane which lies between the clutch disks 3, 4 passes through the center of curvature Z of the friction surfaces 20*a* and 20*b*. The center of curvature Z simultaneously forms the center of the friction clutch and lies at the point of intersection of the central plane M and the clutch axis of rotation A.

Convex friction surfaces 21*a*, 21*b*, 22*a*, 22*b*, the geometrical shape of which corresponds to a boundary surface of spherical segments with plane-parallel end faces and which is matched to the friction surfaces 20*a*, 20*b* of the clutch ring 2, are formed on the clutch disks 3 and 4.

The clutch disks 3 and 4 have narrowed portions 23*a*, 23*b*, 24*a* and 24*b*, at which edge regions of the clutch disks 3 and 4 deviate from the shape of spherical segment surfaces. In FIG. 4, it can be seen that the narrowed portions 23*a*, 23*b*, 24*a* and 24*b* are matched to an inner radius of outer edges 29*a* and 29*b*. On each of the clutch disks 3 and 4, the narrowed portions are formed so as to run parallel to one another, on opposite narrow sides of the clutch disks 3, 4. As a result, a body axis for a position and direction is defined on each of the clutch disks 3 and 4 for an assembly movement. During assembly of the clutch disks 3, 4, provision is made for the narrowed portions 23*a*, 23*b*, 24*a* and 24*b* to be arranged congruently with one another to enable the clutch disks 3, 4 to be brought simultaneously into a position which allows a subsequent assembly step.

By pressing the clutch disks 3, 4 together parallel to the principal axes of symmetry or axes of rotation thereof, the outline of a cross section formed jointly by both clutch disks 3 and 4 can be reduced in such a way that the narrowed portions 23*a*, 23*b*, 24*a* and 24*b* of the clutch disks can be introduced past the outer edges 29*a* and 29*b* into the clutch ring 2. By this means, the clutch disks 3 and 4 can be positioned in the clutch ring in such a way that the central point of the pressed-together clutch disks 3 and 4 coincides with the center of curvature Z of the concave spherical friction surfaces 20a and 20b.

Figure 5:
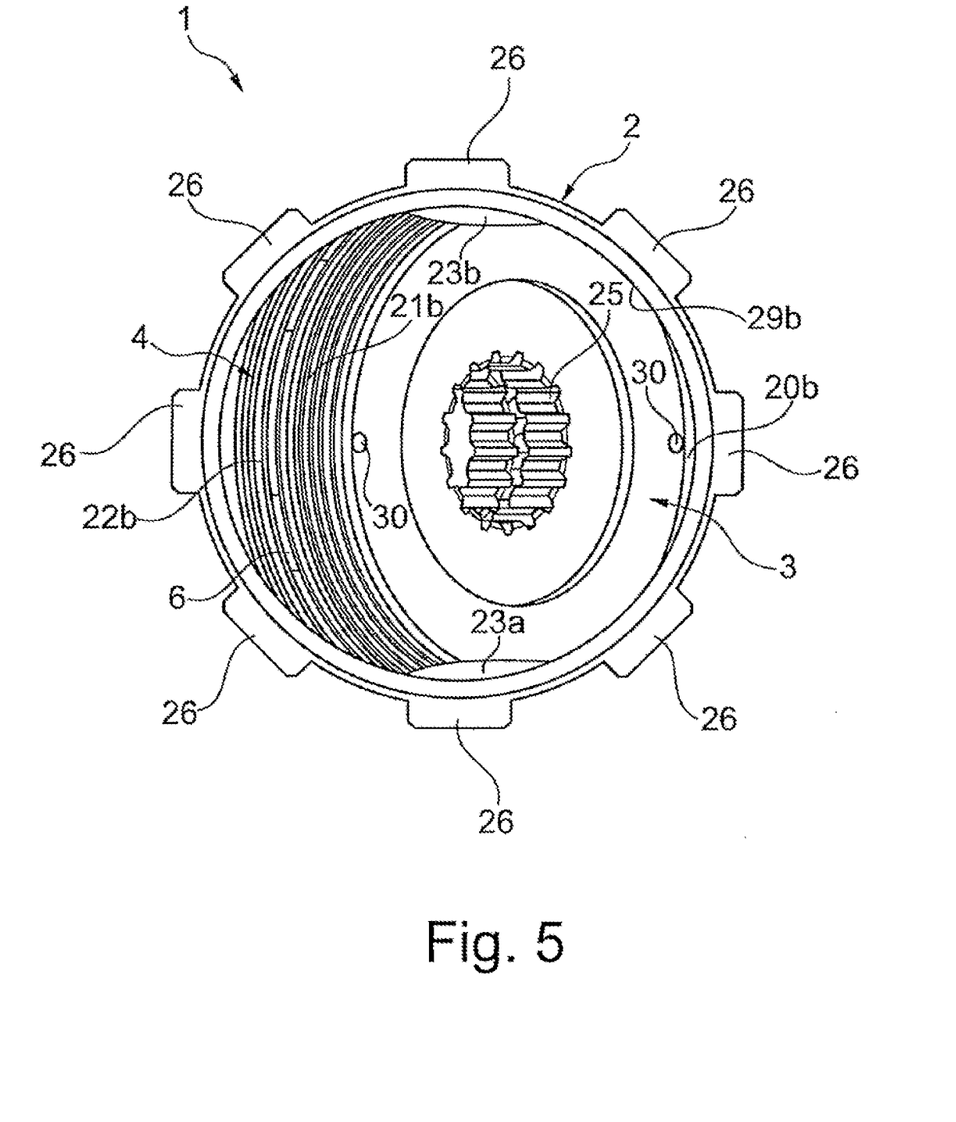
FIG. 5 shows a schematic side view of a clutch in the assembly position.

By virtue of the spherical symmetry of the adjacent surfaces in the clutch ring 2—namely of the concave friction surfaces 20a and 20b—in the position centered with respect to the clutch ring 2, the pressed-together clutch disks 3 and 4 can be rotated about the center of curvature Z, as shown in FIG. 5. They can therefore be pivoted into a position which is coplanar with the center plane M of the clutch ring 2, in which position they can rotate jointly with the clutch ring 2 about the clutch axis of rotation A in the coupled, frictionally engaged state.

Figures 6, 7A, 7B:
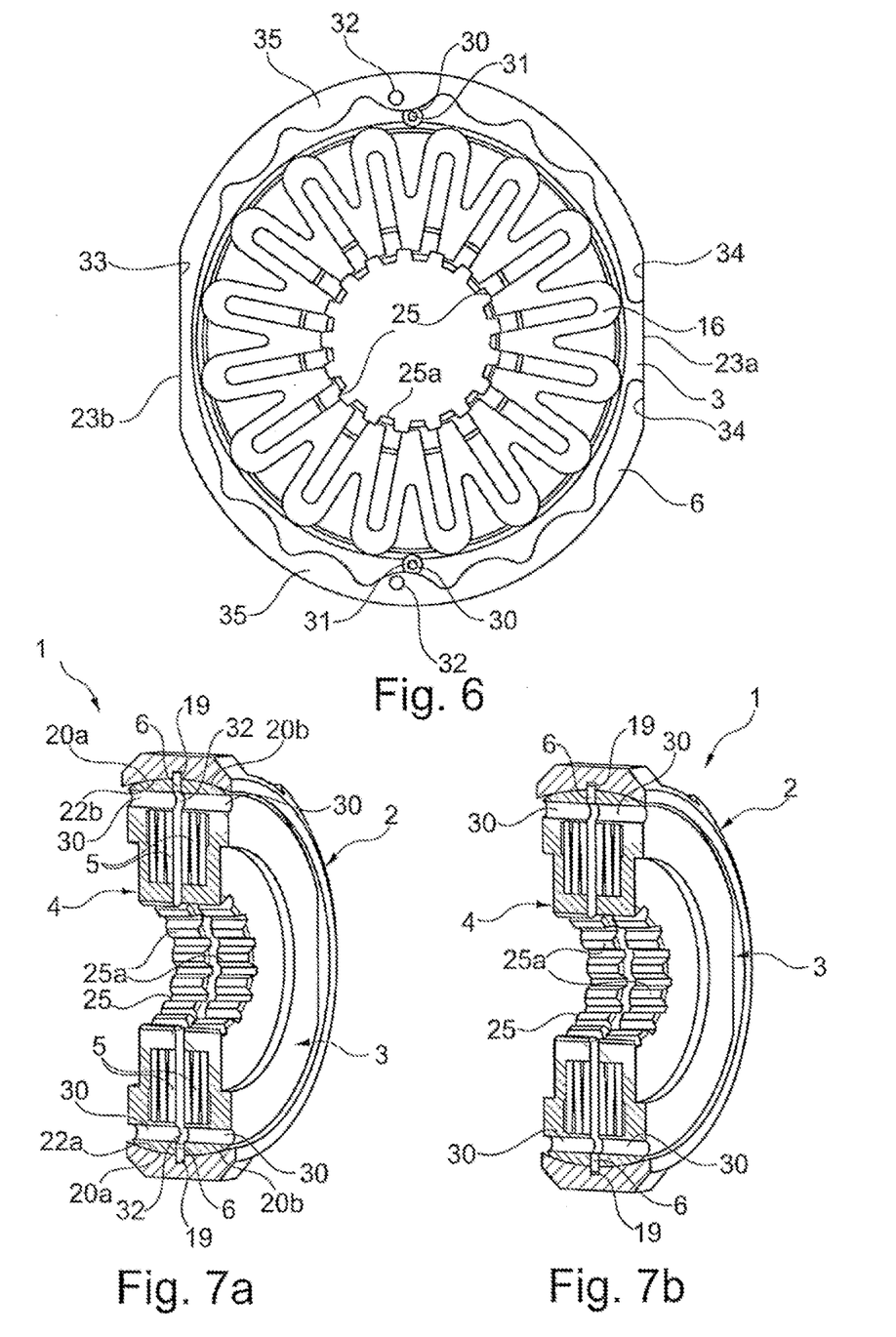
FIG. 6 shows a schematic view of the inner side of a clutch disk and of a stop spring.
FIG. 7a shows a schematic perspective sectional view of a friction clutch in a section plane extending through a clutch axis and parallel thereto.
FIG. 7b shows a schematic perspective sectional view of a friction clutch in a section plane extending through a clutch axis of rotation and parallel thereto.

In the clutch disks 3, 4, it is possible, for example, for two holes 30 to pass through the clutch disks 3, 4 non-centrally, in particular in the vicinity of the friction surfaces 21a, 21b, 22a and 22b, parallel to the axis of rotation. The holes 30 are provided for the purpose of enabling pins 31 to be pushed through both clutch disks 3, 4, at least in the state in which they are pressed together for assembly. This enables the two rotary disks to be fixed relative to one another in such a way that the splines 25a of a spline system are arranged in alignment with one another in the aperture 25, parallel to the clutch axis of rotation. In this case, the two clutch disks 3, 4 can be secured against twisting relative to one another by means of the pins, thereby ensuring that the clutch disks continue to be held congruent with one another in respect of the narrowed portions 23a, 23b, 24a and 24b during assembly. The holes 30 and the pins 31 furthermore offer the possibility of installing not only a passage disk 16 but, in particular, also a stop spring 6 in the clutch ring 2 together with the clutch disks 3, 4.

In the widened arcuate segments 35, the stop spring 6 has holes 32, through which the pins 31 can be passed. A tapered region 33 is formed between the widened segments 35 on one side, by means of which region spring 6 can be compressed elastically in order to bring the holes 32 of the stop spring 6 into overlap with the holes 30 in clutch disk 3 and to pass the pins 31 through the holes 32. Through the fixing of the stressed stop spring 6 on clutch disk 3 by means of the fixing pins 31, it is possible to reduce the external outline of the stop spring 6 in such a way that the stop spring 6 is arranged completely within the external outline of clutch disk 3 and thus cannot protrude beyond the outline of the clutch disks 3, 4 at any point. In this way, the stop spring 6 is set between the clutch disks 3, 4 in such a way that it can be inserted into the clutch disks 2 simultaneously with the clutch disks. If appropriate, the fixing pins 31 can be designed for fixing of the clutch disks with springs 5 compressed.

Once the clutch disks have been brought into a coplanar central position in the clutch ring, the fixing pins 31 can be released in order to allow the stop ring 6 to expand, it being possible for the latter to penetrate into the groove 19 between the friction surfaces 20a and 20b of the clutch ring 2. This offers the advantage that the clutch ring 2 can be designed as a self-contained body, thereby necessitating in the clutch ring an opening or aperture which passes radially from the outside to the groove 19, impairing the strength of the clutch ring 2.

Figure 8A:
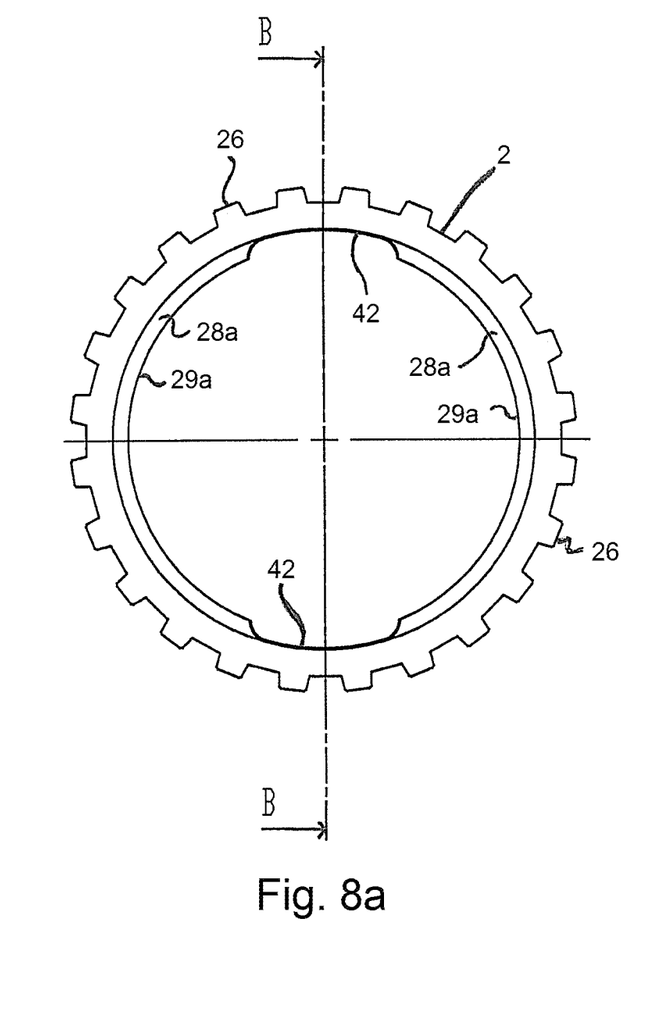
FIG. 8a shows a schematic view of a clutch ring of another embodiment of a clutch according to the invention.
Figure 8B:
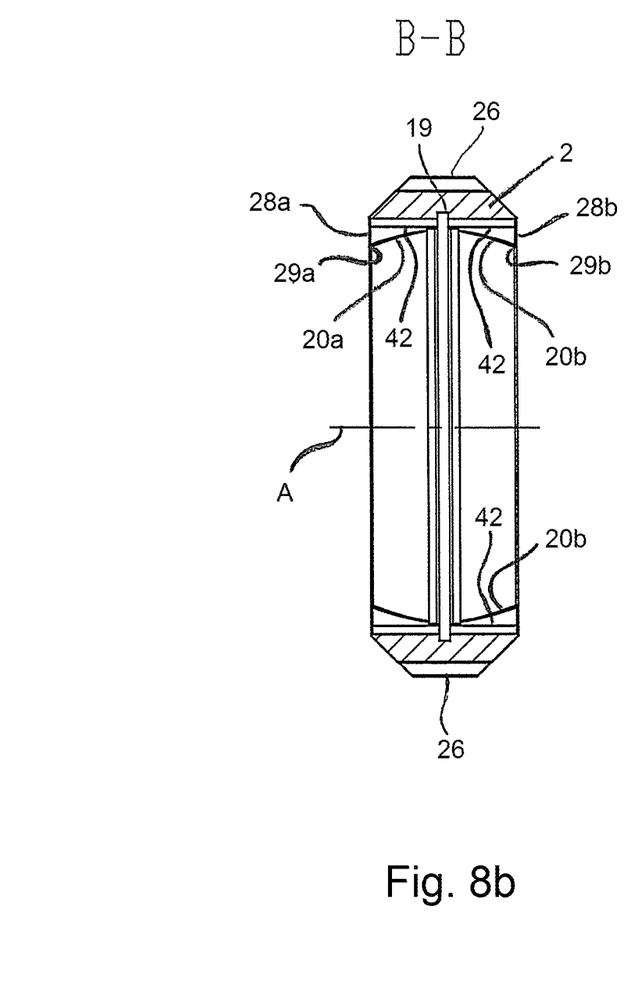
FIG. 8b shows a schematic sectional side view of the clutch ring in a section plane comprising an axis of rotational symmetry of the clutch ring.
Figure 8C:
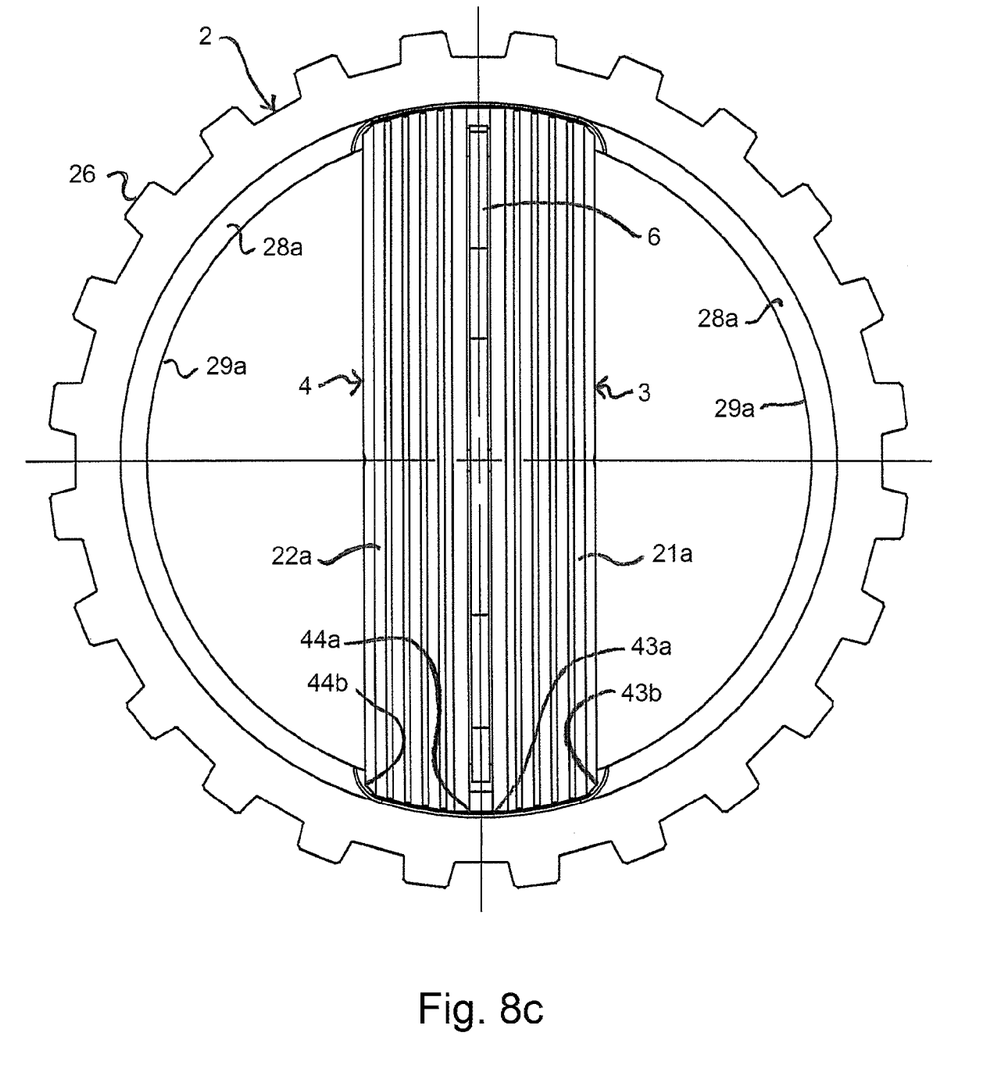
FIG. 8c shows a schematic view of the clutch ring with clutch disks in a temporary mounting position within the clutch ring.

FIGS. 8a-8c show details of another embodiment of a friction clutch according to the invention. FIGS. 8a and 8b show a clutch ring 2 on which two friction surfaces 20a and 20b are provided circumferentially at the inside of the clutch ring 2. Between the friction surfaces 20a and 20b, a groove 19 is formed circumferentially at the inside of the ring 2 and in a central position between outer faces 28a and 28b of the ring 2.

The friction surfaces 20a and 20b are concavely formed with a curvature around an axis of rotational symmetry and with an additional curvature along the axis A. Preferably, each of the friction surfaces 20a and 20b is formed like a section of a hollow sphere. The concave friction surfaces 20a and 20b are partially facing each other in the direction of axis A. The friction clutch further comprises two disks 3 and 4 which are provided for being placed together within the clutch ring 2. Between a maximum outer perimeter 43a and an a minimum outer perimeter 43b of the clutch ring 3 a convex friction surface 21a is formed which is essentially adapted to at least one of the friction surfaces 20a and 20b of the clutch ring 2. Similarly, a convex friction surface 22a is formed between a maximum outer perimeter 44a and a minimum outer perimeter 44b of the clutch disk 4 which is at least adapted to the other one of the two friction surfaces 20a and 20b.

In large part the embodiment shown in FIGS. 8a-8c can be similar to the ones described above except for the following details. Each of the friction surfaces 20a and 20b is interrupted by two recesses 42 which are placed at opposite positions at the inside of the clutch ring 2. Each recess 42 reaches from one outer face 28a to a second outer face 28b on opposite sides of the clutch ring 2 which are delimiting the clutch ring 2 in a direction along the axis A.

Furthermore, circumferential contours of the clutch disks along the perimeters 43a, 43b, 44a and 44b can be perfectly circular in contrast to the clutch disks 3 and 4 of the embodiment shown in FIG. 2, for example.

In their combination, the recesses 42 are adapted to a maximum contour of a cross section of a tight arrangement—as shown in FIG. 8c—of two the two clutch disks 3 and 4 having a stop ring 6 and springs (not shown) placed between the two disks 3 and 4. Hence, the recesses 42 allow for inserting the arrangement of the disks 3 and 4 into the clutch ring 2. After arriving at a central position within the clutch ring 2 the assembly with the clutch disks 3 and 4 can be turned by an angle of 90°. Then the assembly can be released as described for the previous embodiments so that friction surfaces 21a and 22a of the disks 3 and 4 are pressed against the friction surfaces 20a and 20b of the ring 2 by the springs (not shown here) pushing the disks 3 and 4 apart.

LIST OF REFERENCE SIGNS 1 friction clutch
2 clutch ring
3 clutch disk
4 clutch disk
5 spring element
6 stop ring
7 retaining ring
8 driver element
9 screw
10 driving wheel
11 shaft section
12 shaft section
13 rotary bearing
14 annular piston
15 cylinder
16 passage disk
17 oil feed line
18a friction surface pair
18b friction surface pair
19 groove
20a concave friction surface
20b concave friction surface
21a convex friction surface
21b convex friction surface
22a convex friction surface
22b convex friction surface 23a narrowed portion
23b narrowed portion
24a narrowed portion
24b narrowed portion
25 aperture
25a spline
26 twist blocking elements
27 passage opening
28a end face
28b end face
29a outer edge
29b outer edge
30 hole
31 fixing pin
32 opening
33 segment
34 end segment
40 compressor
41 housing
42 recess
43a perimeter
43b perimeter
44a perimeter
44b perimeter

The invention claimed is:

1. A friction clutch comprising a clutch ring and two clutch disks inserted in the clutch ring and pivoted to be aligned with the clutch ring, wherein the clutch ring and the clutch disks are mounted so as to be rotatable about a clutch axis of rotation and have friction surfaces formed thereon, wherein the clutch ring is a continuous one piece component and the clutch disks can be moved parallel to the clutch axis of rotation and relative to one another in such a way that, for torque transmission, first friction surfaces on each of the clutch disks can be moved into frictional surface contact with respective second friction surfaces on the clutch ring,
wherein the first and the second friction surfaces are matched to one another as a friction surface pair of a curved convexly friction surface in a direction of the clutch axis of rotation and a curved concavely friction surface in the direction of the clutch axis of rotation.

2. The friction clutch according to claim 1, further comprising a fixing recess by which a stop element can be mounted temporarily on at least one of the clutch disks for joint assembly with the clutch disks in the clutch ring.

3. The friction clutch according to claim 1, wherein the concavely and the convexly curved friction surfaces have at least approximately a spherical profile.

4. The friction clutch according to claim 1, wherein the friction surfaces of the friction surface pair are shaped in the manner of a curved boundary surface of a spherical segment.

5. The friction clutch according to claim 1, wherein the second friction surfaces on the clutch ring are concavely curved.

6. The friction clutch according to claim 1, wherein diameters of the clutch disks are reduced in such a way over an angle segment around a predetermined axis of rotation that the clutch disks can be introduced jointly into the clutch ring.

7. The friction clutch according to claim 1, wherein diameters of the two clutch disks are each reduced symmetrically with respect to a predetermined axis of rotation over an angle segment.

8. The friction clutch according to claim 1, further comprising at least one recess, with the aid of which the clutch disks can be introduced into the clutch ring, formed on the clutch ring.

9. The friction clutch according to claim 1, further comprising one or more springs, which push the clutch disks away from one another, arranged between the clutch disks.

10. The friction clutch according to claim 1, wherein the first friction surface on each clutch disk extends less than the entire outer circumferential surface of the clutch disk, or the second friction surfaces on the clutch ring extend less than the entire inner circumferential surface of the clutch ring.

* * * * *